US011959455B1

(12) United States Patent
Hu et al.

(10) Patent No.: US 11,959,455 B1
(45) Date of Patent: Apr. 16, 2024

(54) CONTROL METHOD AND DEVICE OF ENERGY-STORAGE COORDINATED FLOATING WIND TURBINE

(71) Applicants: NORTH CHINA ELECTRIC POWER UNIVERSITY, Beijing (CN); HUANENG GROUP R & D CENTER CO LTD, Beijing (CN)

(72) Inventors: Yang Hu, Beijing (CN); Ziqiu Song, Beijing (CN); Fang Fang, Beijing (CN); Jizhen Liu, Beijing (CN); Xiaojiang Guo, Beijing (CN); Qinghua Wang, Beijing (CN); Heng Ge, Beijing (CN)

(73) Assignees: NORTH CHINA ELECTRIC POWER UNIVERSITY, Beijing (CN); HUANENG GROUP R &D CENTER CO LTD, Beijing (CN)

( * ) Notice: Subject to any disclaimer, the term of this patent is extended or adjusted under 35 U.S.C. 154(b) by 0 days.

(21) Appl. No.: 18/131,484

(22) Filed: Apr. 6, 2023

(30) Foreign Application Priority Data

Nov. 15, 2022 (CN) .......................... 202211421464.0

(51) Int. Cl.
*F03D 13/25* (2016.01)
*F03D 7/04* (2006.01)
(Continued)

(52) U.S. Cl.
CPC ............. *F03D 13/25* (2016.05); *F03D 7/045* (2013.01); *F03D 9/11* (2016.05); *H02J 3/32* (2013.01); *H02J 3/381* (2013.01); *H02J 2300/28* (2020.01)

(58) Field of Classification Search
CPC .. F03D 13/25; F03D 9/11; F03D 7/045; H02J 3/32; H02J 3/381
(Continued)

(56) References Cited

U.S. PATENT DOCUMENTS 7,071,579 B2 * 7/2006 Erdman .................. F03D 7/048
  290/55
8,154,141 B2 * 4/2012 Andresen .................. F03D 9/10
  290/55
(Continued)

FOREIGN PATENT DOCUMENTS

CN  112636374  4/2021
CN  113824156  12/2021
(Continued)

OTHER PUBLICATIONS

Huang et al. ("Oscillation Characteristic Analysis and Wind-Storage Control of Wind Farms with Energy Storage Participating in Primary Frequency Regulation", EMIE , 2022, China, pp. 1-6) (Year: 2022).*
(Continued)

*Primary Examiner* — Iftekhar A Khan
(74) *Attorney, Agent, or Firm* — Casimir Jones, S.C.; Brian F. Bradley

(57) ABSTRACT

Provided are control method and device of an energy-storage coordinated floating wind turbine, relating to the technical field of wind turbines. The control method of an energy-storage coordinated floating wind turbine can construct a primary frequency regulation model of a floating wind farm based on a frequency response unit, construct a second frequency regulation model according to an energy storage system, further construct, according to the primary frequency regulation model and the second frequency regulation model, a frequency regulation model of a hybrid power system containing the floating wind farm, the energy storage system, and a pre-set thermal power unit, and design an overall frequency regulation control strategy of the hybrid power system based on the frequency regulation model of the hybrid power system.

10 Claims, 7 Drawing Sheets

(51) Int. Cl.
  *F03D 9/11*       (2016.01)
  *H02J 3/32*       (2006.01)
  *H02J 3/38*       (2006.01)
(58) Field of Classification Search
  USPC .......................................................... 703/18
  See application file for complete search history.

(56) References Cited

U.S. PATENT DOCUMENTS

| | | | | |
|---|---|---|---|---|
| 9,915,243 | B2* | 3/2018 | Sagi | G05B 15/02 |
| 10,090,685 | B2* | 10/2018 | Shim | H02J 7/0048 |
| 10,581,249 | B2* | 3/2020 | Scott | F03D 7/028 |
| 10,823,134 | B2* | 11/2020 | Wilson | F03B 13/20 |
| 11,088,546 | B2* | 8/2021 | Brombach | F03D 9/257 |
| 11,196,262 | B2* | 12/2021 | Brombach | F03D 9/11 |
| 11,211,798 | B2* | 12/2021 | Bao | H02J 3/381 |
| 11,245,263 | B2* | 2/2022 | Ma | H03L 7/099 |
| 2006/0087124 | A1 | 4/2006 | Stahlkopf | F03D 9/11 |
| | | | | 290/44 |
| 2010/0090532 | A1* | 4/2010 | Shelton | H02J 3/32 |
| | | | | 307/46 |
| 2010/0138070 | A1 | 6/2010 | Beaudoin | F03D 7/0284 |
| | | | | 700/297 |
| 2011/0257801 | A1* | 10/2011 | Kumula | H02P 9/04 |
| | | | | 700/287 |
| 2014/0316592 | A1* | 10/2014 | Haj-Maharsi | G05B 15/02 |
| | | | | 290/44 |
| 2014/0339828 | A1* | 11/2014 | Peiffer | B63B 43/06 |
| | | | | 290/44 |
| 2015/0354532 | A1* | 12/2015 | Nielsen | F03D 7/0204 |
| | | | | 416/85 |
| 2019/0277255 | A1* | 9/2019 | Nielsen | G05D 1/0875 |
| 2020/0191117 | A1* | 6/2020 | Li | F03D 7/046 |
| 2021/0269126 | A1* | 9/2021 | Allen | B63B 35/44 |
| 2021/0296902 | A1* | 9/2021 | Alshehri | G05B 6/02 |
| 2022/0021211 | A1* | 1/2022 | Ma | G05B 11/42 |
| 2022/0195986 | A1* | 6/2022 | Wu | F03D 9/25 |

FOREIGN PATENT DOCUMENTS

| | | |
|---|---|---|
| CN | 114039386 | 2/2022 |
| CN | 114629139 | 6/2022 |
| CN | 114784854 | 7/2022 |
| WO | 2022/036787 | 2/2022 |

OTHER PUBLICATIONS

Of Karimi et al.("A fully coupled frequency domain model for floating offshore wind turbines", Journal of Ocean Engineering and Marine Energy (2019) 5:135-158) (Year: 2019).*

Mi et al. "Sliding mode load frequency control for multiarea time-delay power system with wind power integration", IET Gener. Transm. Distrib., 2017, pp. 4644-4653) (Year: 2017).*

Uehara et al. ("Frequency Control by Coordination Control of WTG and Battery using Load Estimation", IEEE, 2009, pp. 216-221) (Year: 2009).*

Liu et al. (Coordinated Control Strategy of Wind Power Fluctuation Suppression and Frequency Modulation Based on Hybrid Energy Storage System,2021, IEEE, pp. 1-6) (Year: 2021).*

Pegalajar-Juradoet al. (An efficient frequency-domain model for quick load analysis of floating offshore wind turbines, Wind Energ. Sci., 3, 693-712, 2018) (Year: 2018).*

Hall et al. (An Open-Source Frequency-Domain Model for Floating Wind Turbine Design Optimization, Journal of Physics: Conference Series; (2022) pp. 1-12) (Year: 2022).*

Wang et al. (Non-fragile load frequency control of multi-area power system with energy storage system and wind power subject to circular pole constraints, 2021, Elsevier Ltd., pp. 1-9) (Year: 2021).*

Song, Ziqiu et al. "Coordinated Control of Semi-submersible Floating Turbine with Model Predictive Control Strategy" Proceedings of the CSEE, vol. 42, No. 12, Jun. 20, 2022, 10 pages, English Abstract provided.

Feng, H. et al. "Structural loads suppression for floating offshore wind turbine via Optimized Pitch Control" 2021 IEEE 4th International Electrical and Energy Conference, 5 pages.

Office Action, CN Patent Application No. 202211421464.0, dated Dec. 23, 2022, 6 pages.

Notification to Grant Patent Right, CN Patent Application No. 202211421464.0, dated Jan. 20, 2023, 1 page.

* cited by examiner

CONTROL METHOD AND DEVICE OF ENERGY-STORAGE COORDINATED FLOATING WIND TURBINE

CROSS-REFERENCE TO RELATED APPLICATION

The present disclosure claims the priority to the Chinese patent application with the filing No. 2022114214640, filed on Nov. 15, 2022 with the State Intellectual Property Office of China, the contents of which are incorporated by reference herein in entirety.

TECHNICAL FIELD

The present disclosure relates to the technical field of wind turbines, and in particular, to a control method and a device of an energy-storage coordinated floating wind turbine.

BACKGROUND ART

As wind energy resources are featured by fluctuation, intermittency, randomness and so on, large-scale wind power grid connection may destroy balance between active power and load of a power system, cause fluctuations of grid frequency, and threaten safe and economical operation of the power system. Moreover, floating wind power and onshore wind power have obvious differences, and the complex operation environment makes it quite hard for the floating wind turbine to stabilize parameters and smooth output power under existing control strategies. The impact on the grid is more serious after large-scale grid connection.

Further, under the influences of wind and wave loads, displacement and pitch movement will occur to the floating platform and a tower body of the wind turbine, and cause output power of a wind farm to vary around a desired value, and fluctuations of the frequency of the power system will be induced after grid connection. However, with the increase of degree of regional interconnection of power system and the improvement of floating wind power permeability, the problem of grid frequency fluctuations will become more and more serious.

SUMMARY

In view of this, the present disclosure aims at providing a control method and a device of an energy-storage coordinated floating wind turbine, so as to alleviate the technical problem of aggravation of frequency fluctuations of the power system caused by high-proportion floating wind farm grid connection.

In a first aspect, an embodiment of the present disclosure provides a control method of an energy-storage coordinated floating wind turbine, including: acquiring a frequency response unit configured for a floating wind farm, and constructing a primary frequency regulation model of the floating wind farm based on the frequency response unit, wherein the floating wind farm includes a plurality of floating wind turbines, each of the floating wind turbines is configured with the frequency response unit, and the frequency response unit is configured to respond to a frequency change of a power system; acquiring an energy storage system configured for the floating wind farm, and constructing a second frequency regulation model based on the energy storage system, wherein each of the floating wind turbines is configured with the energy storage system; constructing, based on the primary frequency regulation model and the second frequency regulation model, a frequency regulation model of a hybrid power system containing the floating wind farm, the energy storage system, and a pre-set thermal power unit; acquiring a frequency change parameter of the power system through the frequency response unit, calculating a primary frequency regulation control strategy of the floating wind turbine through the primary frequency regulation model based on the frequency change parameter, and calculating a second frequency regulation control strategy of the energy storage system through the second frequency regulation model; and generating an overall frequency regulation control strategy of the hybrid power system according to the primary frequency regulation control strategy and the second frequency regulation control strategy.

In combination with the first aspect, an embodiment of the present disclosure provides a first possible implementation of the first aspect, wherein the above frequency response unit performs comprehensive control by using pre-set virtual inertia control mode and droop control mode; the primary frequency regulation model includes a frequency regulation branch corresponding to each of the floating wind turbines, wherein the frequency regulation branch is configured to calculate a frequency regulation output power change amount of each of the floating wind turbines according to pre-set inertia control parameter and droop control parameter; and the step of constructing a primary frequency regulation model of the floating wind farm based on the frequency response unit includes: calculating the frequency regulation output power change amount of each of the floating wind turbines through the primary frequency regulation model, and collecting and processing the frequency regulation output power change amount, so as to generate an output change amount during frequency regulation of the floating wind farm.

In combination with the first possible implementation of the first aspect, an embodiment of the present disclosure provides a second possible implementation of the first aspect, wherein the above energy storage system is a battery energy storage system, the battery energy storage system includes an energy storage battery, an energy management system, and a power conversion system; the second frequency regulation model includes an energy conversion mechanism model of the energy storage system; the energy conversion mechanism model is configured to characterize charge and discharge logic of the energy storage system; and the step of constructing a second frequency regulation model based on the energy storage system includes: detecting a frequency feedback signal of the power system through the power conversion system; calculating, based on the second frequency regulation model, compensation power of the energy storage system according to the frequency feedback signal, wherein the compensation power is configured to compensate for frequency deviation caused by frequency disturbance of the power system.

In combination with the first aspect, an embodiment of the present disclosure provides a third possible implementation of the first aspect, wherein the above step of constructing, based on the primary frequency regulation model and the second frequency regulation model, a frequency regulation model of a hybrid power system containing the floating wind farm, the energy storage system, and a pre-set thermal power unit includes: combining and processing output characteristics of the energy storage system and output characteristics of the floating wind farm to generate an energy storage wind farm containing the energy storage system; combining the energy storage wind farm with the pre-set thermal power unit to obtain the hybrid power system containing the floating wind farm, the energy storage system, and the pre-set thermal power unit; acquiring a frequency regulation model of the thermal power unit, wherein the frequency regulation model of the thermal power unit includes a governor model and a steam turbine model; and constructing the frequency regulation model of the hybrid power system based on the governor model, the steam turbine model, the primary frequency regulation model, and the second frequency regulation model.

In combination with the second possible implementation of the first aspect, an embodiment of the present disclosure provides a fourth possible implementation of the first aspect, wherein the above step of calculating a primary frequency regulation control strategy of the floating wind turbine through the primary frequency regulation model based on the frequency change parameter includes: generating, based on the primary frequency regulation model, the primary frequency regulation control strategy by using a rotor kinetic energy control frequency regulation strategy and an overspeed load-shedding control strategy to perform a frequency regulation control over the floating wind turbine.

In combination with the fourth possible implementation of the first aspect, an embodiment of the present disclosure provides a fifth possible implementation of the first aspect, wherein the above step of calculating a second frequency regulation control strategy of the energy storage system through the second frequency regulation model includes: setting a constraint range of the energy storage battery based on remaining capacity parameters of the energy storage battery; and calculating the second frequency regulation control strategy within the constraint range, wherein the second frequency regulation control strategy includes: controlling the energy storage battery to absorb or release an active power in accordance with a pre-set virtual inertia control strategy according to the frequency feedback signal; or, controlling the energy storage battery to be charged or discharged in accordance with a pre-set droop control strategy.

In combination with the fifth possible implementation of the first aspect, an embodiment of the present disclosure provides a sixth possible implementation of the first aspect, wherein the above step of generating an overall frequency regulation control strategy of the hybrid power system according to the primary frequency regulation control strategy and the second frequency regulation control strategy includes: setting a frequency regulation dead band of the energy storage battery according to a pre-set frequency change threshold; performing frequency regulation control over the hybrid power system through the primary frequency regulation control strategy within a frequency change range corresponding to the frequency regulation dead band; performing the frequency regulation control over the hybrid power system through the primary frequency regulation control strategy outside the frequency change range corresponding to the frequency regulation dead band, and performing the frequency regulation control over the hybrid power system through the second frequency regulation control strategy within the constraint range.

In a second aspect, an embodiment of the present disclosure further provides a control device of an energy-storage coordinated floating wind turbine, including: a first constructing module, configured to acquire a frequency response unit configured for a floating wind farm, and construct a primary frequency regulation model of the floating wind farm based on the frequency response unit, wherein the floating wind farm includes a plurality of floating wind turbines, each of the floating wind turbines is configured with the frequency response unit, and the frequency response unit is configured to respond to a frequency change of a power system; a second constructing module, configured to acquire an energy storage system configured for the floating wind farm, and construct a second frequency regulation model based on the energy storage system, wherein each of the floating wind turbines is configured with the energy storage system; a third constructing module, configured to construct, based on the primary frequency regulation model and the second frequency regulation model, a frequency regulation model of a hybrid power system containing the floating wind farm, the energy storage system, and a pre-set thermal power unit; a strategy module, configured to acquire a frequency change parameter of the power system through the frequency response unit, calculate a primary frequency regulation control strategy of the floating wind turbine through the primary frequency regulation model based on the frequency change parameter, and calculate the second frequency regulation control strategy of the energy storage system through the second frequency regulation model; and a control module, configured to generate an overall frequency regulation control strategy of the hybrid power system according to the primary frequency regulation control strategy and the second frequency regulation control strategy.

In a third aspect, an embodiment of the present disclosure further provides an electronic equipment, including a processor, a storage medium, and a bus, wherein the storage medium stores machine-readable instructions executable by the processor, and when the electronic equipment is running, the processor is in communication with the storage medium via the bus, and the processor executes the machine-readable instructions, so as to implement the steps of the method according to the first aspect.

In a fourth aspect, an embodiment of the present disclosure further provides a computer-readable storage medium, wherein the computer-readable storage medium stores a computer program, and the computer program, when executed by the processor, implements the steps of the above method according to the first aspect.

The embodiments of the present disclosure bring about the following beneficial effects:

The control method and device of an energy-storage coordinated floating wind turbine provided in the embodiments of the present disclosure can construct the primary frequency regulation model of the floating wind farm based on the frequency response unit, construct the second frequency regulation model according to the energy storage system, further construct the frequency regulation model of the hybrid power system containing the floating wind farm, the energy storage system, and the pre-set thermal power unit according to the primary frequency regulation model and the second frequency regulation model, and design the overall frequency regulation control strategy of the hybrid power system based on the frequency regulation model of the hybrid power system, so as to improve the frequency regulation performances of the hybrid power system. In the process of designing the overall frequency regulation control strategy, by fully utilizing the energy storage system to effectively compensate for the fluctuations in grid frequency, and taking the primary frequency regulation coordinated control of the energy storage system and operation load of the floating wind turbine into account, the economy and stability of the hybrid power system, as well as the service lifetime of the energy storage system and the floating wind turbine can be effectively improved.

Other features and advantages of the present disclosure will be illustrated in the following description, and partially become obvious from the description or be understood by implementing the present disclosure. The objectives and other advantages of the present disclosure are realized and obtained from the description, the claims, and the structures specifically indicated in the drawings.

In order to make the above objectives, the features, and the advantages of the present disclosure more obvious and understandable, preferred embodiments are specifically illustrated to make detailed descriptions below in conjunction with the drawings attached.

BRIEF DESCRIPTION OF DRAWINGS

In order to illustrate the technical solutions in the embodiments of the present disclosure or the related art more clearly, the drawings that need to be used in the description of the embodiments or the prior art are briefly introduced as follows. Obviously, the drawings in the following description show some embodiments of the present disclosure. For those skilled in the art, other drawings can also be obtained according to these drawings without using any creative efforts.

DETAILED DESCRIPTION OF EMBODIMENTS

Figure 1:
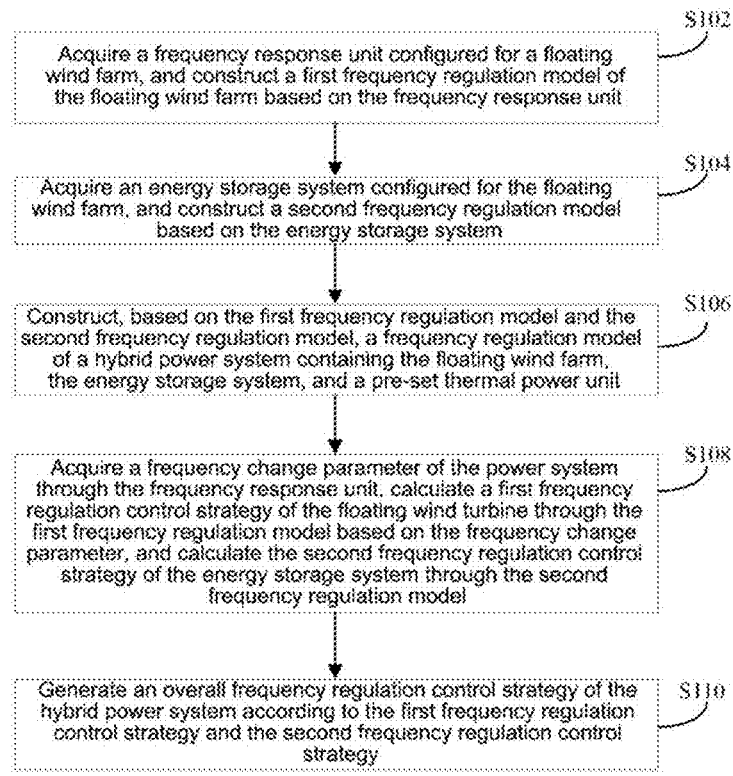
FIG. 1 is a flowchart of a control method of an energy-storage coordinated floating wind turbine provided in an embodiment of the present disclosure.

In order to make objectives, technical solutions, and advantages of embodiments of the present disclosure clearer, below the technical solutions in the present disclosure will be described clearly and completely in conjunction with the drawings, and apparently, some but not all embodiments of the present disclosure are described. All of other embodiments, obtained by a person skilled in the art based on the embodiments of the present disclosure without using any creative efforts, shall fall into the scope of protection of the present disclosure.

Generally, under influences of wind and wave loads, displacement and pitch movement will occur to a floating platform of a floating wind farm and a tower body of a floating wind turbine, and cause output power of the floating wind farm to vary around a desired value. Fluctuations of grid frequency of the power system will be caused after grid connection. With the increase of degree of regional interconnection of power system and the improvement of floating wind power permeability, the problem of grid frequency fluctuations will become more and more serious. Therefore, it is necessary to reduce frequency fluctuations caused by the large-scale floating wind turbine grid connection on the power system through technical transformation means, and improve the economy and safety of the power system in the future.

At present, researches on the floating wind turbine participating in primary frequency regulation of the power system mainly involve onshore wind power and coastal fixed pile wind power, wherein main methods include rotor kinetic energy control, load-shedding operation control, and participation of energy-storage in frequency regulation control. The rotor kinetic energy control can be divided into virtual inertia control and droop control. The load-shedding operation control is mainly divided into rotor overspeed control and variable pitch control. All the above researches contribute to the participation of wind machines in the field of primary frequency regulation of power systems; and meanwhile, on the basis of these researches, the following research contents are still lacked in this field: 1) researches on frequency characteristics of a hybrid power system containing a floating wind farm; 2) qualitative and quantitative influences of high-proportion floating wind farm grid connection on the power system; and 3) researches on a primary frequency regulation control strategy in the context of high-proportion floating wind farm grid connection.

On this basis, an embodiment of the present disclosure provides a control method and a control device of an energy-storage coordinated floating wind turbine, which can alleviate the problem of aggravation of frequency fluctuations of the power system grid caused by high-proportion floating wind farm grid connection, and specifically involve establishment of a primary frequency regulation model of a power system containing a floating wind farm, and design of the primary frequency regulation control strategy of the energy-storage coordinated floating wind farm based on the above model, so as improve the frequency regulation performances of the power system.

In order to facilitate understanding the present embodiment, firstly, a control method of an energy-storage coordinated floating wind turbine disclosed in an embodiment of the present disclosure is introduced in detail.

In a possible implementation, an embodiment of the present disclosure provides a control method of an energy-storage coordinated floating wind turbine, specifically, a flowchart of a control method of an energy-storage coordinated floating wind turbine is shown in FIG. 1, and the method includes the following steps:

step S102, acquiring a frequency response unit configured for a floating wind farm, and constructing a primary frequency regulation model of the floating wind farm based on the frequency response unit;

in the above, the floating wind farm includes a plurality of floating wind turbines, each floating wind turbine is configured with the frequency response unit, and the frequency response unit is configured to respond to a frequency change of a power system;

step S104, acquiring an energy storage system configured for the floating wind farm, and constructing a second frequency regulation model based on the energy storage system;

in the above, each floating wind turbine is configured with the energy storage system;

in specific implementation, the primary frequency regulation model in the above step S102 is actually a primary frequency regulation model of the floating wind farm. Moreover, in the embodiments of the present disclosure, the floating wind farm is also referred to as an offshore wind farm, and the floating wind turbine refers to a floating offshore wind turbine, for example, a variable-speed and constant-frequency floating offshore wind turbine. Therefore, in the primary frequency regulation model, a floating offshore wind turbine is usually taken as a single machine object of a wind field. Moreover, in the embodiments of the present disclosure, in order to realize that a variable-speed and constant-frequency floating wind turbine participates in frequency regulation of a power system, the floating wind turbine is usually equipped with the frequency response unit, so that output of the floating wind turbine can respond to change in grid frequency of the power system. Moreover, the frequency response unit in the embodiments of the present disclosure generally calculates an additional active power reference signal of the floating wind turbine by adopting a comprehensive control mode of virtual inertia control and droop control, according to deviation of grid connection frequency of the floating offshore wind farm.

Further, the second frequency regulation model in the above step S104 is actually a primary frequency regulation model of the energy storage system. In practical use, the primary frequency regulation model of the energy storage system can establish a charge and discharge logic of the energy storage system according to an energy storage type selected, further obtain an energy conversion mechanism model of the energy storage system, and obtain compensation power of the energy storage system by measuring a feedback signal of grid frequency.

Step S106, constructing, based on the primary frequency regulation model and the second frequency regulation model, a frequency regulation model of a hybrid power system containing the floating wind farm, the energy storage system, and a pre-set thermal power unit;

step S108, acquiring a frequency change parameter of the power system through the frequency response unit, calculating a primary frequency regulation control strategy of the floating wind turbine through the primary frequency regulation model based on the frequency change parameter, and calculating a second frequency regulation control strategy of the energy storage system through the second frequency regulation model; and step S110, generating an overall frequency regulation control strategy of the hybrid power system according to the primary frequency regulation control strategy and the second frequency regulation control strategy.

In practical use, the hybrid power system in the above step S106 is actually a primary frequency regulation model of a hybrid power system that combines the thermal power unit, an offshore wind farm, and the energy storage system, and are also known as the wind-storage-thermal hybrid power system.

In step S108 and step S110 of the primary frequency regulation model of the hybrid power system, when generating the frequency regulation control strategy, the primary frequency regulation operation characteristics of the selected energy storage system can be combined to determine the charge and discharge logic of an energy storage unit in the energy storage system. As small-amplitude frequency disturbance within a specific range may be not adjusted when the power system operates normally, a primary frequency regulation dead band segment can be set for the energy storage unit. In order to ensure stable operation of the energy storage unit and extend its service lifetime, the energy storage unit is required not to be over-charged and over-discharged, therefore, a constraint range of remaining power of the energy storage unit may be further specified. In addition, virtual inertia control and droop control are combined as a control method of the primary frequency regulation of the energy storage system.

The floating wind turbine mainly uses the primary frequency regulation control strategy of combination of rotor kinetic energy and overspeed load-shedding. When the frequency of the power system drops, the virtual inertia of the floating wind turbine is used to quickly convert the rotor kinetic energy into generator power; after the inertia response, the overspeed load-shedding control starts to take effect, so that the floating wind turbine operates above an original load-shedding operation curve, thus increasing output power of the floating wind turbine to participate in the primary frequency regulation of the system; and when the system frequency is stabilized within an allowable range, the overspeed load-shedding control stops working, and in this case the floating wind turbine operates stably at a new load-shedding rate.

Therefore, the control method of an energy-storage coordinated floating wind turbine provided in the embodiment of the present disclosure can construct the primary frequency regulation model of the floating wind farm based on the frequency response unit, construct the second frequency regulation model according to the energy storage system, further construct the frequency regulation model of the hybrid power system containing the floating wind farm, the energy storage system, and the pre-set thermal power unit according to the primary frequency regulation model and the second frequency regulation model, and design the overall frequency regulation control strategy of the hybrid power system based on the frequency regulation model of the hybrid power system, so as to improve the frequency regulation performances of the hybrid power system. In the process of designing the overall frequency regulation control strategy, by fully utilizing the energy storage system to effectively compensate for the fluctuations in grid frequency, and taking the primary frequency regulation coordinated control of the energy storage system and operation load of the floating wind turbine into account, the economy and stability of the hybrid power system, as well as the service lifetime of the energy storage system and the floating wind turbine can be effectively improved.

In practical use, for the frequency regulation model of the above hybrid power system, effectiveness of the primary frequency regulation control thereof can also be further verified based on Matlab/Simulink and high-fidelity simulation software FAST. During the simulation, frequency change deviation of the power system, frequency regulation response speed, output smoothness of the floating wind turbine, and degree of variable load of the thermal power unit are mainly used as evaluation criteria. Generally, based on Matlab/Simulink and the high-fidelity simulation software FAST, numerical simulation experiments are carried out in scenarios of load step changes and random changes, and time domain data can be obtained. Comparison is made between the control effects of the frequency regulation of the control strategy of the embodiment of the present disclosure and control frequency regulation through combination of rotor kinetic energy and overspeed load-shedding, so that the effectiveness of the above method provided in the embodiment of the present disclosure in the frequency control of the power system under the large-scale floating wind turbine grid connection is proved.

In practical use, the above frequency response unit performs comprehensive control by using pre-set virtual inertia control mode and droop control mode; moreover, the above primary frequency regulation model includes a frequency regulation branch corresponding to each floating wind turbine, wherein the frequency regulation branch is configured to calculate a frequency regulation output power change amount of each floating wind turbine according to pre-set inertia control parameter and droop control parameter; and when constructing the primary frequency regulation model of the floating wind farm, the frequency regulation output power change amount of each floating wind turbine is generally calculated through the primary frequency regulation model, and the frequency regulation output power change amount is collected to generate an output change amount during the frequency regulation of the floating wind farm.

For ease of understanding, illustration is made by taking that 5 MW semi-submersible floating offshore wind turbine is a single machine object of the wind field as an example. The above process of constructing the primary frequency regulation model is actually to construct the primary frequency regulation model of the floating wind farm. In order to realize the participation of the floating wind turbine in the frequency regulation of the power system, additional frequency regulation is indispensable. In an embodiment of the present disclosure, by equipping the floating wind turbine with the frequency response unit, the output of the floating wind turbine can be made to respond to change in the grid frequency of the power system. Specifically, in an embodiment of the present disclosure, the frequency response unit calculates an additional active power reference signal of the wind machine according to grid connection frequency deviation of the floating onshore wind farm by using the comprehensive control mode of virtual inertia control and droop control, i.e., $$\Delta P^* = -\left(K_H \frac{d\Delta f^*}{dt} + K_D \Delta f^*\right);$$

in the formula: $K_H$ and $K_D$ are an inertia control coefficient and a droop control coefficient, respectively, and $\Delta f^*$ is a grid connection frequency change amount of the floating wind farm, which can be acquired through the frequency response unit.

Figure 2:
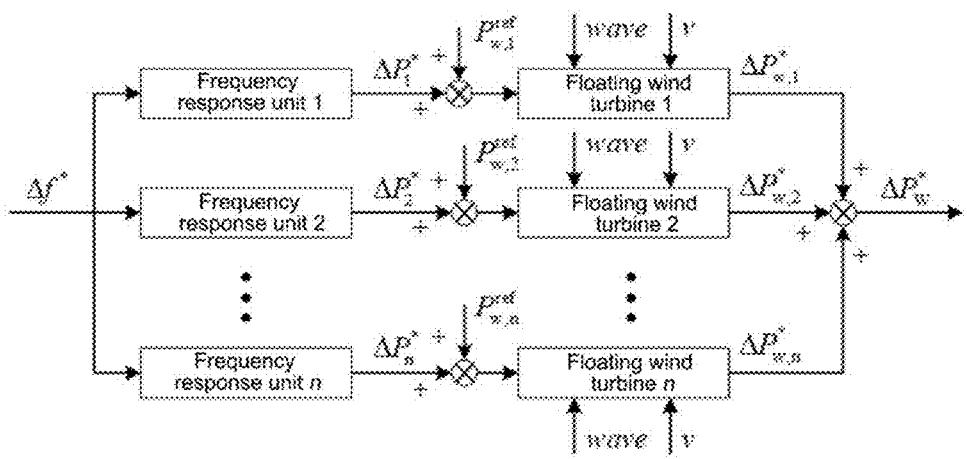
FIG. 2 is a schematic diagram of a primary frequency regulation model provided in an embodiment of the present disclosure.

Further, FIG. 2 shows a schematic diagram of a primary frequency regulation model, i.e., FIG. 2 shows a primary frequency regulation model of a floating wind farm, wherein in FIG. 2, the primary frequency regulation model of the floating wind farm containing n floating wind turbines is taken as an example to illustrate, each floating wind turbine being configured with one frequency response unit. In FIG. 2, $P_{w,i}^{ref}$, $\Delta P^*_i$, and $\Delta P^*_{w,i}$ are an initial output power reference value, the additional active power reference signal, and the frequency regulation output power change amount of an i-th floating wind turbine, respectively; $\Delta f^*$ is the grid connection frequency change amount of the above floating wind farm, $\Delta P^*_w$ is the output change amount during the frequency regulation of the floating wind farm, all in unit of pu; and v and wave are a wind load and a wave load of the floating wind turbine, respectively.

Further, in the embodiment of the present disclosure, the above energy storage system is a battery energy storage system, wherein the battery energy storage system includes an energy storage battery, an energy management system, and a power conversion system, i.e., with the energy storage unit as the energy storage system of the energy storage battery. Based on this energy storage system, the above second frequency regulation model includes an energy conversion mechanism model of the energy storage system, wherein the energy conversion mechanism model is configured to characterize the charge and discharge logic of the energy storage battery in the energy storage system; therefore, when constructing the second frequency regulation model based on the energy storage system, a frequency feedback signal of the power system can be detected through the power conversion system; then based on the second frequency regulation model, compensation power of the energy storage system is calculated according to the frequency feedback signal, wherein the compensation power is configured to compensate for frequency deviation caused by frequency disturbance of the power system.

In specific implementation, the above battery energy storage system can handle power in two directions, having an extremely fast response speed and a relatively mature technology, which have unique advantages in frequency regulation of power system of large-scale new energy grid connection. The battery energy storage system (BESS) mainly includes an energy storage unit, an energy management system, and a power conversion system. Among them, a converter in the power conversion system and the energy storage battery in the energy storage unit are the most critical.

Figure 3:
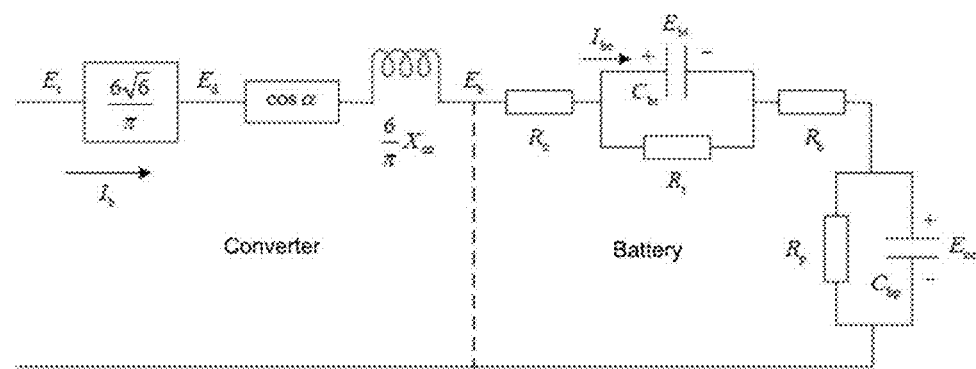
FIG. 3 is an equivalent circuit diagram of a battery energy storage system provided in an embodiment of the present disclosure.

For ease of understanding, FIG. 3 shows an equivalent circuit diagram of the battery energy storage system, as shown in FIG. 3, including the converter and a battery, wherein the battery is the energy storage battery, $E_t$ is phase voltage of grid, $E_d$ is terminal voltage of the converter, $E_b$ is terminal voltage of the battery, $E_{bt}$ is overvoltage of the battery, and $E_{oc}$ is open-circuit voltage of the battery, all in unit of V; $R_c$ is connection resistance, $R_t$ is overvoltage resistance, $R_b$ is internal resistance, and $R_p$ is discharge resistance, all in unit of Ω; $C_{bt}$ is overvoltage capacitance, and $C_{bp}$ is discharge capacitance, both in unit of F; α is a trigger angle of the converter; $X_{co}$ is impedance of an inductor of the converter, in unit of Ω; $I_b$ is an input current of the battery energy storage system, and $I_{bc}$ is a current flowing through an overvoltage capacitor of the battery, in unit of A.

Ideally, a maximum DC voltage of the converter without load is:

$$E_{d0} = \frac{6\sqrt{6}}{\pi} E_t;$$

based on FIG. 3, the terminal voltage and an input current of the energy storage battery are expressed as:

$$\begin{cases} E_b = \dfrac{3\sqrt{6}}{\pi} E_t(\cos\alpha_1 + \cos\alpha_2) - \dfrac{6}{\pi} X_{co} I_b \\ I_b = \dfrac{E_b - E_{bt} - E_{oc}}{R + R_b} \end{cases} ;$$

in the embodiments of the present disclosure, influences of active power and load on the grid frequency of the power system are mainly considered, and disturbances caused by reactive power and voltage on the grid frequency of the power system are ignored. Therefore, in the energy storage system, the change in the active power of the energy storage battery is mainly focused, then $$\alpha_1 = -\alpha_2 = \alpha;$$

the active power of the energy storage battery is expressed as:

$$P_b = \dfrac{6\sqrt{6}}{\pi} E_t I_b \cos\alpha = E_{d0} I_b \cos\alpha;$$

denoted as $E_c = E_{d0} \cos\alpha$, then $P_b = E_c I_b$; $P_b$ is linearized, then it can be obtained:

$$\Delta P_b = E_{c0} \Delta I_b + I_{b0} \Delta E_c;$$

generally, the converter of the battery energy storage system makes the battery in a constant-power charge and discharge mode by adjusting a trigger angle $\alpha$ of a thyristor, therefore, $\Delta E_c$ is divided into two parts, wherein one part is used to compensate for deviation caused by change in the input current $I_b$, denoted as $\Delta E_p$, and the other part is used to compensate for deviation caused by the frequency disturbance of the power system, denoted as $\Delta E_d$, then $$\Delta P_b = E_{c0} \Delta I_b + I_{b0}(\Delta E_p + \Delta E_d) = E_{c0} \Delta I_b + I_{b0} \Delta E_p + I_{b0} \Delta E_d$$

As $\Delta E_p$ can compensate for the deviation caused by change in the input current $I_b$, $$E_{c0} \Delta I_b + I_{b0} \Delta E_p = 0$$

Therefore $$\Delta E_p = -\dfrac{E_{c0}}{I_{b0}} \Delta I_b$$

Therefore, the above $\Delta P_b$ can be written as $$\Delta P_b = I_{b0} \Delta E_d$$

On the other hand, a detection device of the power conversion system can calculate $\Delta E_d$ by measuring the feedback signal $\Delta f$ of the grid frequency, which process is expressed as $$\begin{cases} \Delta E_d = \dfrac{K_m}{T_m s + 1} \Delta f \\ \Delta f = f - f_N \end{cases}$$

In the formulas, $K_m$ is a control gain of the detection device; $T_m$ is a time constant of a measuring device, in unit of s, and $f_N$ is a frequency rated value of the power system, in unit of Hz. In this case, a sign function sgn is introduced, then the formula $\Delta P_b$ can be written as:

$$\Delta P_b = I_{b0} \Delta E_d \text{sgn} = \begin{cases} I_{b0} \Delta E_d & \text{sgn} = 1 \\ -I_{b0} \Delta E_d & \text{sgn} = -1 \end{cases} \quad (14)$$

In the formula, when sgn=1, $\Delta P_b > 0$, the battery is discharged; and when sgn=−1, $\Delta P_b < 0$, the battery is charged.

The relationship between internal capacitance and current of the energy storage battery in the charge and discharge process is further analyzed below. As can be seen from FIG. 3, the current flowing through the overvoltage capacitor is $$I_{bc} = C_{bt} \dfrac{dE_{bt}}{dt} \quad (15)$$

$I_{bc}$ and $E_{bt}$ are linearized to obtain $$\begin{cases} I_{bc} = I_{bc0} + \Delta I_{bc} \\ E_{bt} = E_{bt0} + \Delta E_{bt} \end{cases} \quad (16)$$

Formula (15) and formula (16) are combined to obtain $$\dfrac{d\Delta E_{bt}}{dt} = \dfrac{1}{C_{bt}}(I_{bc0} + \Delta I_{bc}) \quad (17)$$

And because $$I_{bc} = \dfrac{R_t}{R_t + X_{bt}} I_b \quad (18)$$

it can be obtained that $$\begin{cases} I_{bc0} = \dfrac{R_t}{R_t + X_{bt}} I_{b0} \\ \Delta I_{bc} = \dfrac{R_t}{R_t + X_{bt}} \Delta I_b \end{cases} \quad (19)$$

Formula (17) and formula (19) are combined to obtain $$\dfrac{d\Delta E_{bt}}{dt} = \dfrac{R_t}{C_{bt}(R_t + X_{bt})}(I_{b0} + \Delta I_b) \quad (20)$$

When building a control model of the battery energy storage system, formula (20) can be equivalent to a first-order inertial element, i.e., $$\Delta E_{bt}(s) = \dfrac{R_t}{T_{bt} s + 1}(I_{b0} + \Delta I_b) \quad (21)$$

Similarly, by analyzing the discharge capacitance of the battery, it can be concluded that $$\dfrac{d\Delta E_{oc}}{dt} = \dfrac{R_p}{C_{bp}(R_p + X_{bp})}(I_{b0} + \Delta I_b) \quad (22)$$

Further, formula (22) is equivalent to an inertial element, to obtain $$\Delta E_{oc}(s) = \frac{R_p}{T_{bp}s + 1}(I_{b0} + \Delta I_b) \quad (23)$$

In formula (21) and formula (23), time constants of the inertial elements are $$\begin{cases} T_{bt} = C_{bt}R_t \\ T_{bp} = C_{bp}R_p \end{cases} \quad (24)$$

Figure 4:
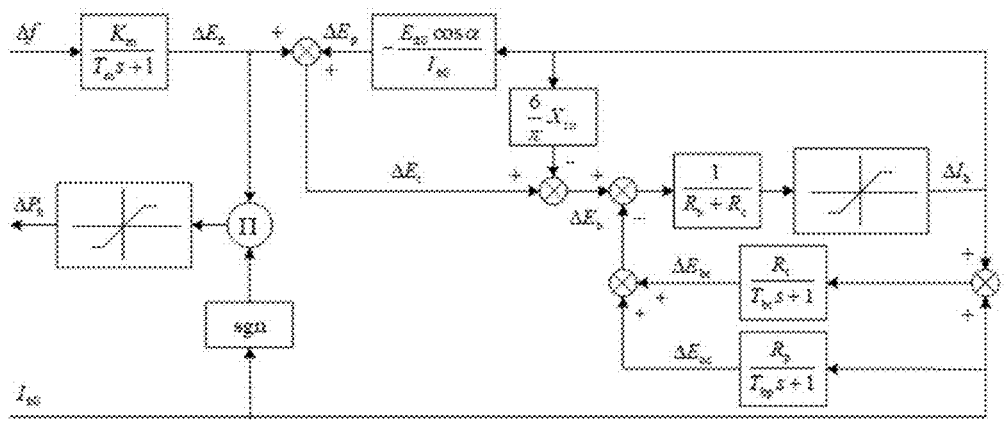
FIG. 4 is a structural diagram of a primary frequency regulation model of a battery energy storage system provided in an embodiment of the present disclosure.

Based on the above derivation process, it is obtained that the primary frequency regulation model of the battery energy storage system has a structure as shown in FIG. 4, i.e., the second frequency regulation model in the embodiments of the present disclosure.

Further, based on the primary frequency regulation model and the second frequency regulation model in the above, the frequency regulation model of the hybrid power system containing the floating wind farm, the energy storage system, and the pre-set thermal power unit can be constructed. Specifically, output characteristics of the energy storage system and output characteristics of the floating wind farm can be combined and processed, so as to generate an energy storage wind farm containing the energy storage system; then the energy storage wind farm and the pre-set thermal power unit are combined to obtain the hybrid power system containing the floating wind farm, the energy storage system, and the pre-set thermal power unit; then a frequency regulation model of the thermal power unit is obtained, wherein the frequency regulation model of the thermal power unit includes a governor model and a steam turbine model; and the frequency regulation model of the hybrid power system is constructed based on the governor model, the steam turbine model, the primary frequency regulation model, and the second frequency regulation model.

In practical use, the frequency regulation model of the thermal power unit in the embodiments of the present disclosure refers to the primary frequency regulation model of the thermal power unit, and the frequency regulation model of the thermal power unit mainly includes the governor model and the steam turbine model, wherein the steam turbine model further includes a non-reheating steam turbine model and a reheating steam turbine model, which are respectively expressed as:

governor model:

$$\begin{cases} G_g(s) = \frac{\Delta P_V^*(s)}{\Delta P_e^*(s)} = \frac{1}{1 + T_g s} \\ \Delta P_e^*(s) = \Delta P_c^*(s) - \frac{1}{R}\Delta f^*(s) \end{cases};$$

non-reheating steam turbine model:

$$G_T(s) = \frac{1}{1 + T_t s};$$

reheating steam turbine model:

$$G_{RT}(s) = \frac{1 + T_R K_R s}{(1 + T_R s)(1 + T_t s)};$$

in the formulas: $\Delta P^*_v$ is valve opening degree change per unit value, $\Delta P^*_e$ is electromagnetic power change per unit value, and $\Delta P^*_c$ is output control signal change per unit value of the power system, all in unit of pu; $T_g$ is a time constant of the governor, $T_t$ is a time constant of the steam turbine, $T_R$ is a time constant of a reheater, all in unit of s, and $K_R$ is a ratio of power generated by steam in a high pressure section to a total power.

In practical use, according to load frequency characteristics of the power system, it can be obtained that:

$$\Delta f^* = \frac{1}{Ms + D}(\Delta P_A^* - \Delta P_L^*);$$

in the formula, $\Delta P^*_A$, is a sum of output of a power supply of the power system, and $\Delta P^*_L$, is a sum of loads in the power system, in unit of pu.

In the embodiments of the present disclosure, the battery energy storage system is used to coordinate floating offshore wind turbines to participate in the primary frequency regulation. Each floating wind turbine is first equipped with the energy storage battery, and the output of the energy storage battery is combined with the output of the floating wind turbine. For example, for a power system containing m thermal power units and n floating wind turbines, the following relationship is satisfied:

$$\begin{cases} \Delta P_A^* = \sum_{i=1}^{m} \alpha_i \Delta P_{g,i}^* + \sum_{j=1}^{n} \beta_j \Delta P_{wb,j}^* \\ \Delta P_{wb,j}^* = \Delta P_{w,j}^* + \Delta P_{b,j}^* \\ \sum_{i=1}^{m} \alpha_i + \sum_{j=1}^{n} \beta_j = 1 \end{cases}$$

Figure 5:
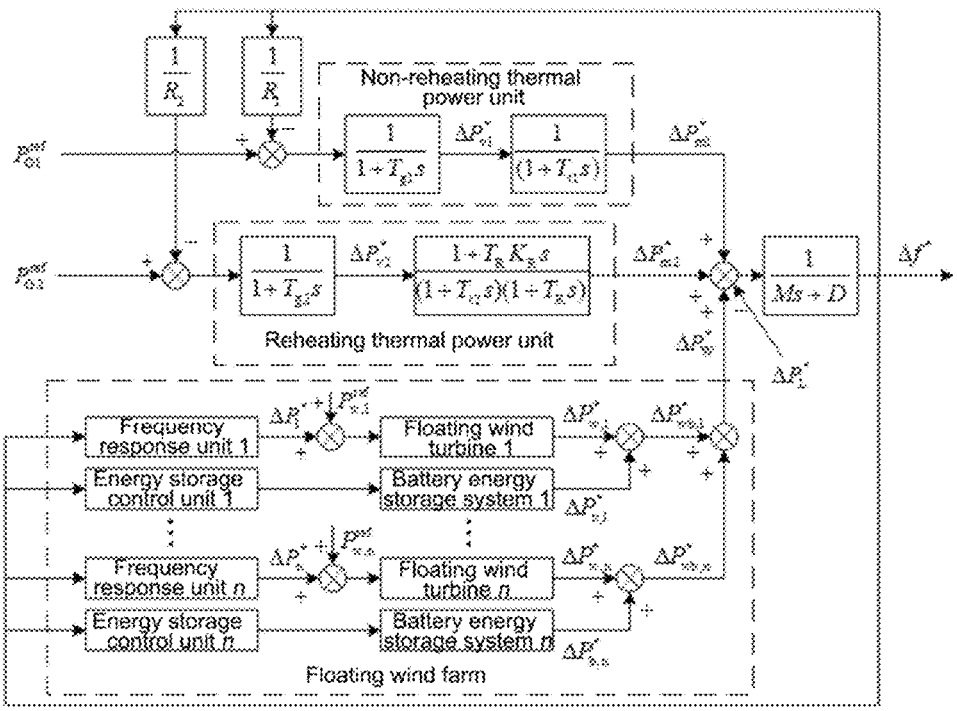
FIG. 5 is a schematic diagram of a primary frequency regulation model of a hybrid power system provided in an embodiment of the present disclosure.

In the formulas, $\Delta P^*_{g,i}$ is an output change amount of an i-th thermal power unit, $\Delta P^*_{wb,j}$ is a sum of an output change amount of a j-th floating offshore wind turbine and the output of the energy storage battery, $\Delta P^*_{w,j}$ is an output change amount of a j-th offshore wind turbine, $\Delta P^*_{b,j}$ is an output of a j-th energy storage battery, all in unit of pu; $\alpha_i$ is a proportion of capacity of an i-th thermal power unit in the power system, and $\beta_j$ is a proportion of capacity of the j-th floating offshore wind turbine in the power system. By combining the thermal power units, the floating offshore wind farms, and the battery energy storage system, the primary frequency regulation model of the wind-storage-thermal hybrid power system can be obtained. For ease of understanding, FIG. 5 shows a schematic diagram of a primary frequency regulation model of the hybrid power system. In FIG. 5, a plurality of floating wind turbines of a floating wind farm, the battery energy storage system and the frequency response unit configured for each floating wind turbine, and the energy storage control unit of the battery energy storage system are included, and a connection diagram of various parts is as shown in FIG. 5, wherein in FIG. 5, $P_{G1}^{ref}$ is an output reference value of the non-reheating thermal power unit, $P_{G2}^{ref}$ is an output reference value of the reheating thermal power unit, $P_{w,i}^{ref}$ is an output power reference value of the floating offshore wind turbine, $\Delta P^*_{m1}$ and $\Delta P^*_{m2}$ are output change amounts of the non-reheating thermal power unit and the reheating thermal power unit, respectively, $\Delta P^*_w$ is an output change amount of the floating offshore wind farm, all in unit of pu; $\Delta P^*_{v1}$ and $\Delta P^*_{v2}$ are valve opening degrees of the non-reheating steam turbine and the reheating steam turbine, respectively, and $R_1$ and $R_2$ are difference-adjustment coefficients of the non-reheating thermal power unit and the reheating thermal power unit, respectively.

Based on the above hybrid power system, during the frequency regulation control, the frequency change parameters of the power system can be obtained through the frequency response unit, and then frequency regulation control can be carried out through the following steps:

(1) generating, based on the primary frequency regulation model, the primary frequency regulation control strategy by using a rotor kinetic energy control frequency regulation strategy and an overspeed load-shedding control strategy, so as to perform frequency regulation control over the floating wind turbine;

(2) setting a constraint range of the energy storage battery based on remaining capacity parameters of the energy storage battery; and calculating the second frequency regulation control strategy within the constraint range, wherein the second frequency regulation control strategy includes: controlling the energy storage battery to absorb or release active power in accordance with a pre-set virtual inertia control strategy according to the frequency feedback signal; or, controlling the energy storage battery to be charged or discharged in accordance with a pre-set droop control strategy; and (3) setting a frequency regulation dead band of the energy storage battery according to a pre-set frequency change threshold; performing the frequency regulation control over the hybrid power system through the primary frequency regulation control strategy within a frequency change range corresponding to the frequency regulation dead band; performing the frequency regulation control over the hybrid power system through the primary frequency regulation control strategy outside the frequency change range corresponding to the frequency regulation dead band, and performing the frequency regulation control over the hybrid power system through the second frequency regulation control strategy within the constraint range.

In the above, the primary frequency regulation control strategy above is actually the primary frequency regulation control strategy for the floating wind turbine; and the second frequency regulation control strategy above is actually the primary frequency regulation control strategy for the energy storage system.

For the floating wind turbine, the primary frequency regulation control strategy of combination of rotor kinetic energy and overspeed load-shedding is mainly used. When the frequency of the power system drops, the virtual inertia of the floating wind turbine is used to quickly convert the rotor kinetic energy into generator power; after inertia response, the overspeed load-shedding control starts to take effect, so that the floating wind turbine operates above the original load-shedding operation curve, thus increasing participation of output power of the floating wind turbine in the primary frequency regulation of the power system. When the frequency of the power system is stabilized within an allowable range, the overspeed load-shedding control stops working, and in this case, the floating wind turbine operates stably at a new load-shedding rate.

To use the rotor kinetic energy of the floating wind turbine to control the frequency regulation, the above frequency response unit needs to be added to the floating wind turbine. The frequency deviation of the power system is converted by the frequency response unit into an additional active power reference signal of the floating wind turbine, and the virtual inertia of the floating wind turbine is used to realize transient exchange between the rotor kinetic energy and the active power. During normal operation, the kinetic energy contained in the rotor of the floating wind turbine can be expressed as $$E_w = \frac{1}{2}J_w\omega_r^2.$$

In the formula, $E_w$ is the rotor kinetic energy of the floating wind turbine, in unit of J; $J_w$ is an equivalent inertia of the floating wind turbine, in unit of kg·m$^2$; and $\omega_r$ is a rotating speed of the floating wind turbine, in unit of rad/s.

The power obtained by the floating wind turbine through releasing the rotor kinetic energy is $$P_w = \frac{dE_w}{dt} = J_w\omega_r\frac{d\omega_r}{dt}$$

Under the rotor overspeed control load-shedding operation, the output power of the floating wind turbine is $$\begin{cases} P_d = P_{max} - \Delta P_d = 0.5\rho\pi R^2 v^3 C_{p,d}(\lambda, \beta) \\ C_{p,d}(\lambda, \beta) = (1-d)C_{P,max}(\lambda_{opt}, \beta) \\ d = \Delta P_d / P_{max} \end{cases}$$

In the formula, $P_d$ is output power of the floating wind turbine in an overspeed load-shedding operation, in unit of W; and $C_{p,d}(\lambda, \beta)$ is a wind energy utilization coefficient under the overspeed load-shedding operation, and d is a load-shedding rate.

Figure 6:
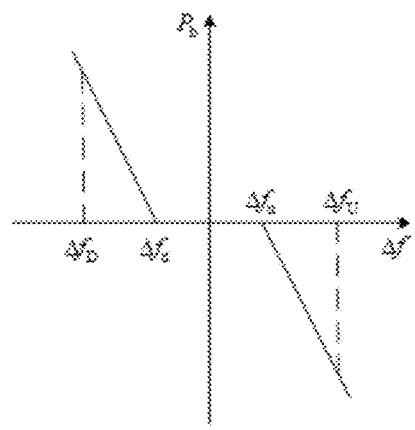
FIG. 6 is a schematic diagram of frequency regulation operation characteristics of a battery energy storage system provided in an embodiment of the present disclosure.

Further, for the primary frequency regulation control strategy of the energy storage system, primary frequency regulation operation characteristics of the battery energy storage system are usually taken into consideration, wherein FIG. 6 shows a schematic diagram of the frequency regulation operation characteristics of the battery energy storage system, and wherein $\Delta f$ in a horizontal axis is a frequency change amount of the power system, and $\Delta P_b$ in a vertical axis is output power of the energy storage battery. When $\Delta P_b > 0$, the energy storage battery is discharged; and when $\Delta P_b < 0$, the energy storage battery is charged. Adjustment may not be performed for Small-amplitude frequency disturbance within a specific range when the power system operates normally, therefore a primary frequency regulation dead band segment is set for the energy storage battery. In FIG. 6, $\Delta fu$ and $\Delta fd$ are upper limit and lower limit of the frequency regulation dead band, respectively, generally 0.03 Hz and −0.03 Hz, respectively.

The charge and discharge states of the energy storage battery are associated with SOC (State of Charge), and there is a limit to depth of charge and discharge actions of the energy storage battery. The battery SOC can be defined as a ratio of remaining power to rated capacity, expressed as:

$$SOC = \frac{E_0 - \int_0^{t_c} \Delta P_b(t)dt}{E_N} = SOC_0 - \frac{\int_0^{t_c} \Delta P_b(t)dt}{E_N};$$

in the formula, $E_0$ and $E_N$ are initial power and rated capacity of the energy storage battery, in unit of J; $t_c$ is charge and discharge time of the battery, in unit of s, and $SOC_0$ is an initial state of charge.

In order to ensure the stable operation of the energy storage battery and prolong service lifetime thereof, the battery is required not to be over-charged or over-discharged, therefore, it is generally stipulated that the constraint range of the energy storage battery SOC is $SOC_{min} \leq SOC \leq SOC_{max}$; in the formula, $SOC_{min}$ and $SOC_{max}$ are lower limit and upper limit of the energy storage battery SOC, respectively, generally 20%~100%.

When studying the relationship between the frequency deviation of the power system and the output power of the battery energy storage system, the battery energy storage system can be equivalent to the first-order inertial element, i.e.;

$$G_b = \frac{\Delta P_b^*(s)}{\Delta f^*(s)} = -\frac{K_b}{1 + T_b s};$$

in the formula, $\Delta P^*_b$ is the output power of the battery energy storage system, in unit of pu; and $T_b$ is an inertia time constant, in unit of s, and $K_b$ is gain.

Similar to the frequency response unit of the floating wind turbine, the primary frequency regulation control mode of the battery energy storage system mainly includes virtual inertia control and droop control.

The virtual inertia control is the battery energy storage system simulating inertia effect of synchronous generator set, and absorbing or releasing active power proportionally according to a rate of change of the frequency deviation of the power system, i.e., $$\Delta P_{bg}^*(s) = sM_b G_b(s)\Delta f^*(s) = -\frac{M_B s}{1 + T_b s}\Delta f^*(s);$$

in the formula, $M_B$ is virtual inertia control gain.

In the droop control, the energy storage battery system is proportionally charged and discharged according to the deviation of the frequency of the power system, i.e., $$\Delta P_{bc}^*(s) = K_{b0} G_b(s)\Delta f^*(s) = -\frac{K_B}{1 + T_b s}\Delta f^*(s);$$

in the formula, $K_B$ is droop control gain.

Figure 7:
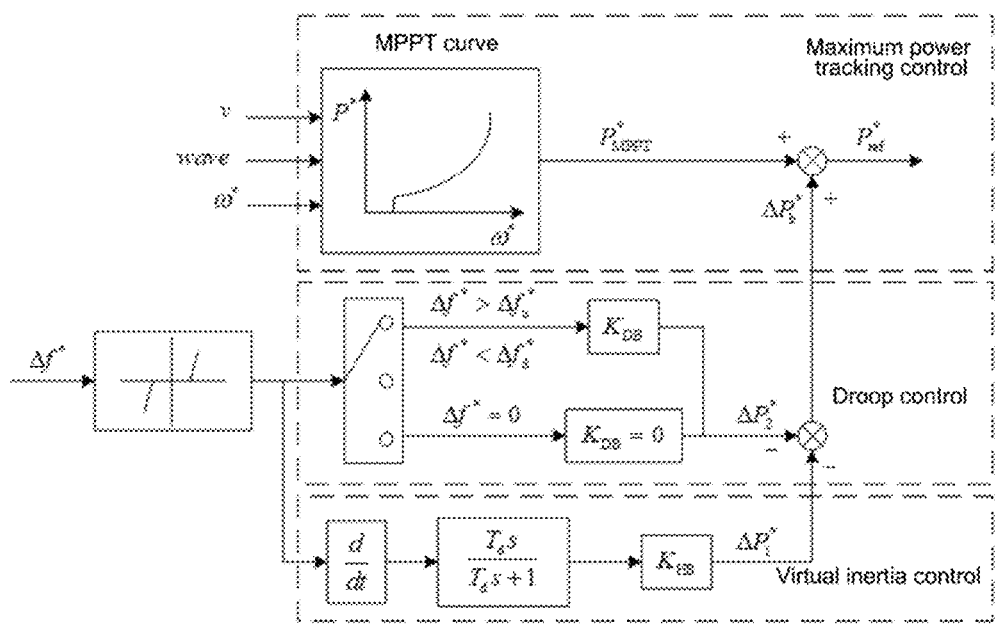
FIG. 7 shows an overall strategy for performing frequency regulation control on the hybrid power system provided in an embodiment of the present disclosure.

Further, the virtual inertia control and the droop control in the above are combined as the primary frequency regulation control mode of the battery energy storage system, and combined with the operation control strategy of floating offshore wind turbine, FIG. 7 also shows an overall strategy of performing the frequency regulation control for the hybrid power system. In FIG. 7, in the maximum power tracking control, the dead band segment of the MPPT curve represents the dead band of the primary frequency regulation of the power system. When the frequency change amount of the power system is within this range, the battery energy storage system does not have charge and discharge actions; in addition, FIG. 7 also shows processes of the droop control and the virtual inertia control, wherein in the virtual inertia control, a high-pass filter is added, for the purpose of removing a steady-state part in a signal of the frequency change amount of the power system, so that the virtual inertia control only acts on the change rate of frequency change amount.

In order to meet the requirements of primary frequency regulation of the power system and avoid over-charge and over-discharge of the energy storage battery, before each charge and discharge action of the battery, it is necessary to first judge whether the current SOC is within a normal operation range; in the charge and discharge process of the battery, when the SOC reaches the upper limit or the lower limit, the battery actively exits the frequency regulation. Specifically, when the SOC meets a specified range requirement of the normal operation of the energy storage battery, the relationship between the output of the battery energy storage system and the frequency change amount of the power system in the primary frequency regulation process is as follows:

$$\Delta P_b^* = \begin{cases} -K_{HB}\frac{d\Delta f^*}{dt} - K_{DB}\Delta f^* > 0 & \Delta f^* < \Delta f_d \\ 0 & \Delta f_d \leq \Delta f^* \leq \Delta f_u \\ -K_{HB}\frac{d\Delta f^*}{dt} - K_{DB}\Delta f^* < 0 & \Delta f^* > \Delta f_u \end{cases}$$

In the formula, $K_{HB}$ and $K_{DB}$ are a virtual inertia coefficient and a droop control coefficient of the battery energy storage system, respectively.

Figure 8:
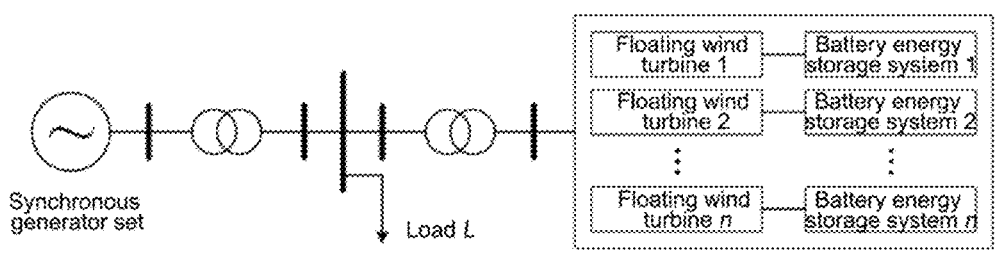
FIG. 8 is a schematic diagram of a simulation verification provided in an embodiment of the present disclosure.

Further, for the above frequency regulation control strategy, simulation verification can also be carried out. For ease of understanding, FIG. 8 shows a schematic diagram of a simulation verification, i.e., FIG. 8 shows a power system structure built in simulation, showing a load L and a synchronous generator set solely included in the power supply of the power system, wherein a load reference of the power system is 1000 MW, the synchronous generator set has capacity of 1600 MW, wherein 100 5 MW semi-submersible floating offshore wind turbines are included, with an installed capacity of 500 MW in total. Each floating offshore wind turbine is equipped with a battery energy storage system with a capacity of 1500 kW×60 s. An input wind speed of the floating offshore wind turbine is set to 8 m/s, a wave height of a sinusoidal wave load is 2 m, an initial load-shedding rate of the floating wind turbine is 20%, the virtual inertia control coefficient and the droop control coefficient are 10.08 and 10, respectively, a time constant of the high-pass filter is set to be 8 s, the initial SOC of the energy storage battery is 70%, and the simulation time is set to 40 s.

Through the simulation process shown in FIG. 8, it can be obtained that:

(1) in the embodiments of the present disclosure, the overall frequency regulation control strategy of the primary frequency regulation model of the hybrid power system is used to reduce the frequency fluctuations of the power system caused by the large-scale floating wind turbine grid connection, and the effectiveness is verified by Matlab/Simulink and high-fidelity software FAST simulation experiments. The result proves that the overall frequency regulation control strategy of the hybrid power system can improve a frequency regulation response speed under the premise of reducing frequency change amplitude of the power system.

Figure 9:
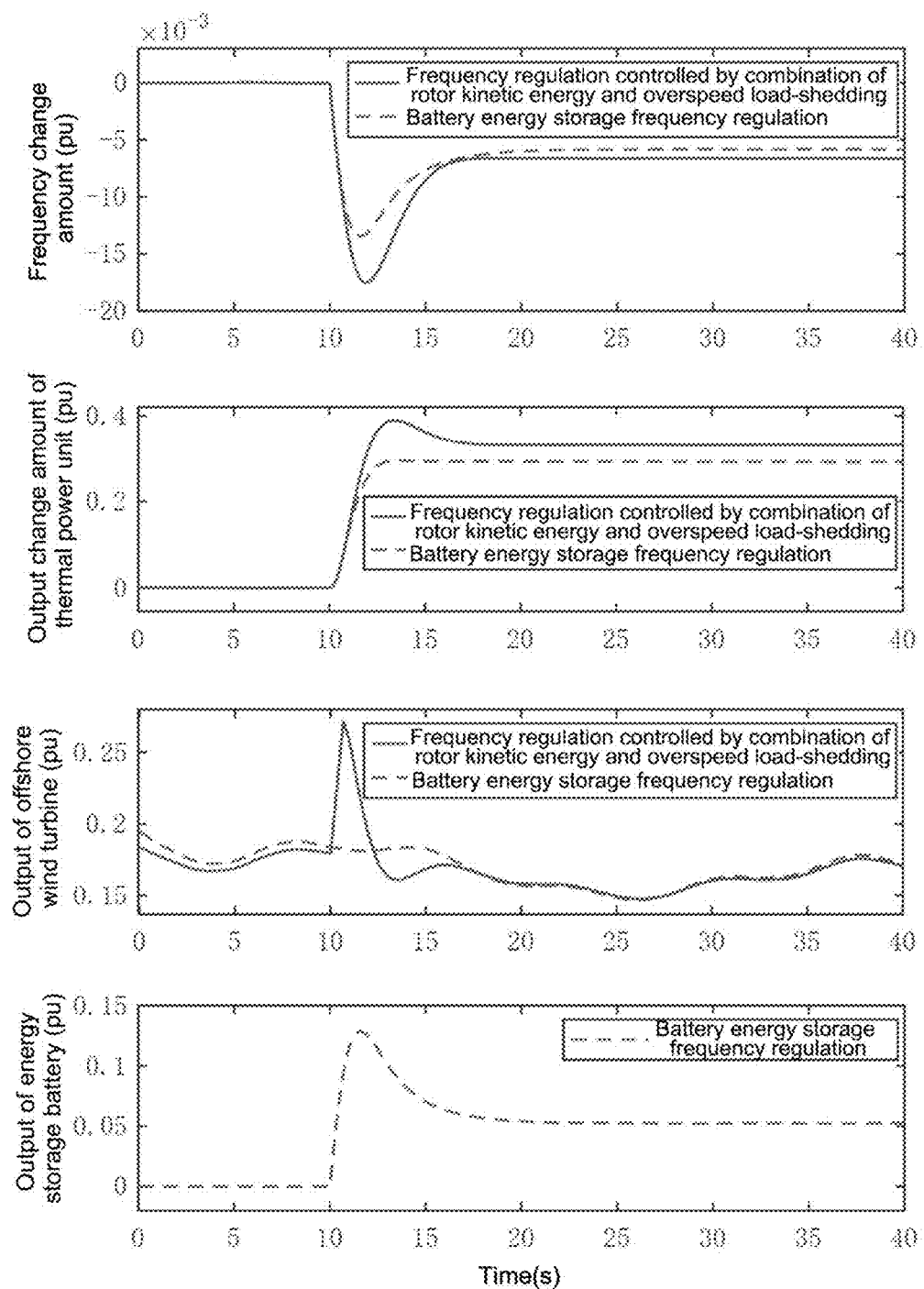
FIG. 9 is a schematic diagram of another simulation verification provided in an embodiment of the present disclosure.

(2) In step load scenarios, the power system initially operates normally, the load is suddenly increased by 0.35 pu at 10 s, and the frequency change amount of the power system, the output of the power supply, and the output of the energy storage battery are as shown in FIG. 9, wherein the offshore wind turbine in FIG. 9 refers to the floating wind turbine in the embodiments of the present disclosure. As can be seen from the curve of frequency change amount of the power system in FIG. 9, compared with the frequency regulation controlled by the combination of the rotor kinetic energy and the overspeed load-shedding, the primary frequency regulation of the power system has better performance under the frequency regulation of the battery energy storage system. Under the frequency regulation of the battery energy storage system, the maximum deviation of the frequency change amount of the power system is −0.013 pu, and steady-state frequency deviation is −0.0058 pu, being reduced by 22.4% and 12.2%, respectively, compared with the frequency regulation controlled by the combination of the rotor kinetic energy and the overspeed load-shedding; and meanwhile, the response speed of frequency regulation of the battery energy storage system is also apparently faster. From the output curve of the energy storage battery, it can be seen that when the load is suddenly increased by 0.35 pu, the output of the battery is positive, and the battery is discharged, equivalent to the power supply in the power system, of which the maximum output is 0.128 pu, and the steady-state output of the battery is 0.052 pu after the primary frequency regulation. It can be seen from the curve of the output change amount of the thermal power unit that because the energy storage battery is discharged, the increment of output of the thermal power unit is decreased under the frequency regulation of the battery energy storage, being reduced by 24.9% compared with the frequency regulation controlled by the combination of the rotor kinetic energy and the overspeed load-shedding.

Figure 10:
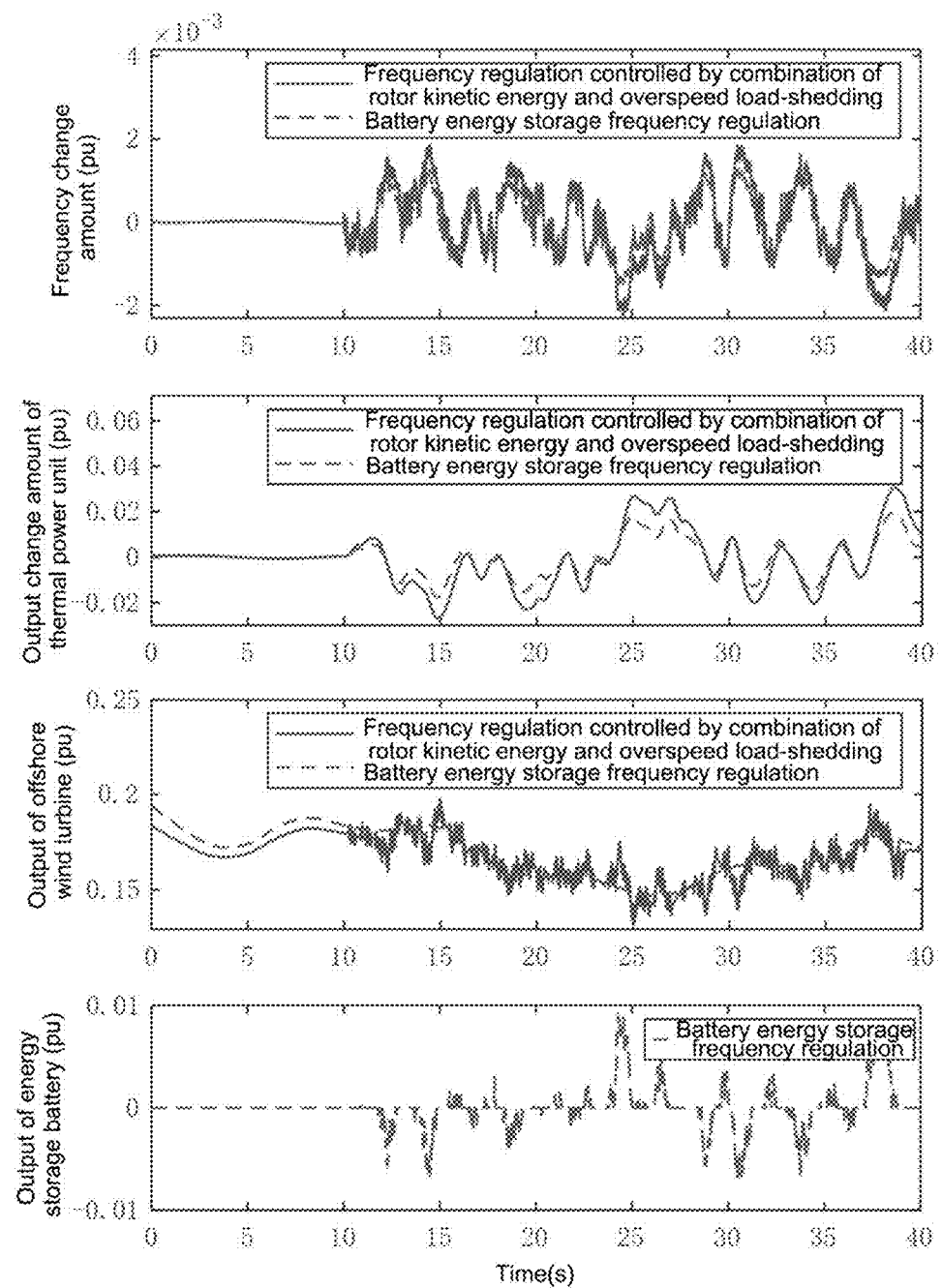
FIG. 10 is a schematic diagram of another simulation verification provided in an embodiment of the present disclosure.

(3) In random load scenarios, when continuously changing random disturbance occurs to the load, the frequency change amount of the power system, the output of the power supply, and the output of the energy storage battery are as shown in FIG. 10, wherein the offshore wind turbine in FIG. 10 is the floating wind turbine in the embodiments of the present disclosure. As can be seen from FIG. 10, under the disturbance of random load, violent oscillations and fluctuations occur to the frequency of the power system in the primary frequency regulation process. Compared with the frequency regulation controlled by the combination of the rotor kinetic energy and the overspeed load-shedding, the frequency regulation control strategy of the battery energy storage system is obviously superior, wherein the frequency regulation of the battery energy storage system can effectively reduce change amplitude and fluctuation degree of the frequency of the power system, and improve the primary frequency regulation performance of the power system. From the output curve of the energy storage battery, it can be seen that under the random load disturbance, the output of the energy storage battery can be positive or negative in the primary frequency regulation process, and the energy storage battery can quickly handle power in two directions and respond to the change in the frequency of the power system, and the battery output is negatively correlated with the frequency deviation of the system. When the frequency of the power system is increased, the battery has negative output, and quickly absorbs the active power of the system for charging; when the frequency of the power system is decreased, the battery has positive output, and quickly outputs the active power for discharging; and when the system frequency deviation is within the range of the frequency regulation dead band, the battery does not have any response. From the perspective of the output change amount of the thermal power unit, the output of the thermal power unit has relatively small change during frequency regulation of the battery energy storage system, which is conducive to reducing the pressure of quick variable load of the thermal power unit, and reducing the operation cost of the unit.

Figure 11:
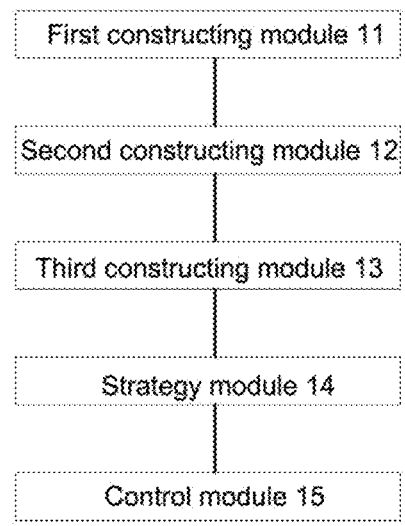
FIG. 11 is a structural schematic diagram of a control device of an energy-storage coordinated floating wind turbine provided in an embodiment of the present disclosure.

On the basis of the above embodiments, an embodiment of the present disclosure further provides a control device of an energy-storage coordinated floating wind turbine, and a structural schematic diagram of a control device of an energy-storage coordinated floating wind turbine is shown in FIG. 11, wherein the device includes:

a first constructing module 11, configured to acquire a frequency response unit configured for a floating wind farm, and construct a primary frequency regulation model of the floating wind farm based on the frequency response unit, wherein the floating wind farm includes a plurality of floating wind turbines, each floating wind turbine is configured with the frequency response unit, and the frequency response unit is configured to respond to a frequency change of a power system;

a second constructing module 12, configured to acquire an energy storage system configured for the floating wind farm, and construct a second frequency regulation model based on the energy storage system, wherein each floating wind turbine is configured with the energy storage system;

a third constructing module 13, configured to construct, based on the primary frequency regulation model and the second frequency regulation model, a frequency regulation model of a hybrid power system containing the floating wind farm, the energy storage system, and a pre-set thermal power unit;

a strategy module 14, configured to acquire a frequency change parameter of the power system through the frequency response unit, calculate a primary frequency regulation control strategy of the floating wind turbine through the primary frequency regulation model based on the frequency change parameter, and calculate the second frequency regulation control strategy of the energy storage system through the second frequency regulation model; and a control module 15, configured to generate an overall frequency regulation control strategy of the hybrid power system according to the primary frequency regulation control strategy and the second frequency regulation control strategy.

The control device of an energy-storage coordinated floating wind turbine provided in the embodiment of the present disclosure, having the same technical features as the control method of an energy-storage coordinated floating wind turbine provided in the above embodiments, can also solve the same technical problems and achieve the same technical effects.

Further, an embodiment of the present disclosure further provides an electronic equipment, including: a processor, a storage medium, and a bus, wherein the storage medium stores machine-readable instructions executable by the processor, and wherein when the electronic equipment is running, the processor is in communication with the storage medium via the bus, and the processor executes the machine-readable instructions, so as to execute the steps of the above method.

Further, an embodiment of the present disclosure further provides a computer-readable storage medium, wherein the computer-readable storage medium stores a computer program, and the computer program, when executed by the processor, implements the steps of the above method.

Figure 12:
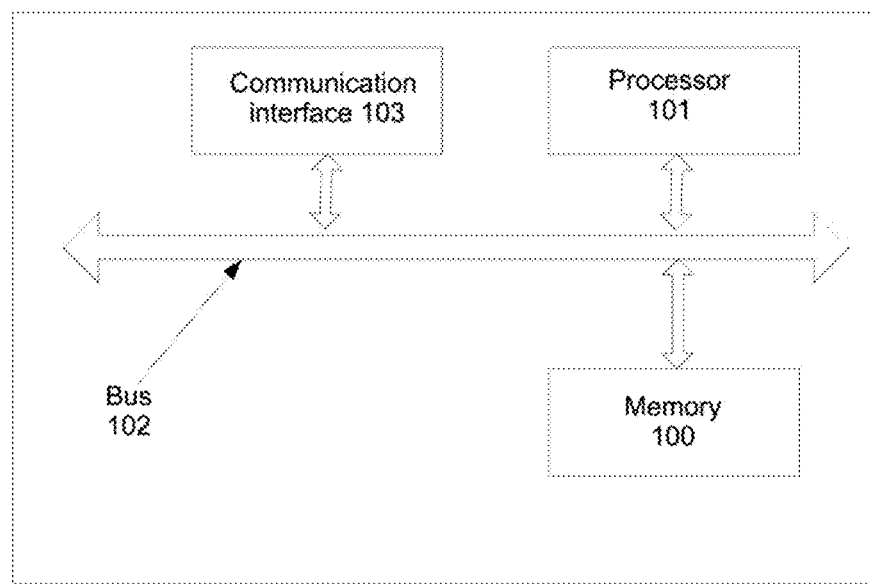
FIG. 12 is a structural schematic diagram of an electronic equipment provided in an embodiment of the present disclosure.

Further, an embodiment of the present disclosure further provides a structural schematic diagram of electronic equipment, as shown in FIG. 12, a structural schematic diagram of the electronic equipment is illustrated, wherein the electronic equipment includes a processor 101 and a memory 100, wherein the memory 100 stores computer-executable instructions executable by the processor 101, and the processor 101 executes the computer-executable instructions so as to implement the above method.

In the implementation shown in FIG. 12, the electronic equipment further includes a bus 102 and a communication interface 103, wherein the processor 101, the communication interface 103, and the memory 100 are connected via the bus 102.

In the above, the memory 100 may include high-speed random access memory (RAM), and also may include non-volatile memory, for example, at least one disk memory. Communication connection between this system network element and at least one other network element is achieved through at least one communication interface 103 (possibly wired or wireless), wherein Internet, Wide Area Network, local network, Metropolitan Area Network and so on may be used. The bus 102 can be an ISA (Industrial Standard Architecture) bus, a PCI (Peripheral Component Interconnect) bus or EISA (Extended Industry Standard Architecture) bus or the like. The bus 102 may be an address bus, a data bus, a control bus and so on. For ease of representation, the bus is represented merely with one two-way arrow in FIG. 12, but it does not mean that there is only one bus or one type of bus.

The processor 101 may be an integrated circuit chip with a signal processing function. In an implementation process, various steps of the above method may be completed by an integrated logic circuit of hardware in the processor 101 or instruction in a software form. The above processor 101 may be a general-purpose processor, including a central processing unit (CPU for short), a network processor (NP for short), etc., and also may be a digital signal processor (DSP for short), an application specific integrated circuit (ASIC for short), a field-programmable gate array (FPGA for short) or other programmable logic devices, discrete gates, transistor logic devices, or discrete hardware components. The general purpose processor may be a microprocessor or the processor also may be any conventional processor and so on. The steps in the method disclosed in combination with the embodiments of the present disclosure may be embodied as being directly carried out and completed by hardware decoding processor, or carried out and completed by hardware and software modules in the decoding processor. The software module may be located in a mature storage medium in the art such as a random access memory, a flash memory, a read-only memory, a programmable read-only memory or an electrically erasable programmable memory, and register. The storage medium is located in the memory, wherein the processor 101 reads the information in the memory and completes the foregoing method in combination with its hardware.

A computer program product of the control method and device of an energy-storage coordinated floating wind turbine provided in an embodiment of the present disclosure includes a computer-readable storage medium in which a program code is stored, and instructions included in the program code may be used to implement the method described in the method embodiment in the preceding. Reference may be made to the method embodiment for specific implementation, which will not be repeated redundantly herein.

A person skilled in the art could clearly know that for the sake of convenience and conciseness of description, reference can be made to corresponding processes in the above method embodiments for specific operation processes of the device described in the above, and they will not be repeated redundantly herein.

In addition, in the description of the embodiments of the present disclosure, unless otherwise specified and defined explicitly, terms "mount", "join", and "connect" should be construed in a broad sense, for example, a connection can be a fixed connection, a detachable connection, or an integrated connection; it can be a mechanical connection, and also can be an electrical connection; it can be a direct connection, an indirect connection through an intermediate medium, or an inner communication between two elements. For a person skilled in the art, specific meanings of the above-mentioned terms in the present disclosure can be understood according to specific circumstances.

If the function is realized in a form of software functional unit and is sold or used as an individual product, it may be stored in one computer readable storage medium. Based on such understanding, the essence of the technical solution of the present disclosure, or a part of the technical solution which contributes to the related art, or a part of the technical solution can be embodied in the form of a software product. The computer software product is stored in a storage medium, including several instructions which are used to make a computer device (which may be a personal computer, a server, or a network device, etc.) implement all or part of the steps of the methods described in various embodiments of the present disclosure. The aforementioned storage medium includes various media in which program codes can be stored, such as U disk, mobile hard disk, read-only memory (ROM), random access memory (RAM), diskette and compact disk.

In the description of the present disclosure, it should be noted that orientation or positional relationships indicated by terms such as "center", "upper", "lower", "left", "right", "vertical", "horizontal", "inner", and "outer" are based on orientation or positional relationships as shown in the drawings, merely for facilitating the description of the present disclosure and simplifying the description, rather than indicating or implying that related devices or elements have to be in the specific orientation, or configured and operated in a specific orientation, therefore, they should not be construed as limitation on the present disclosure. Besides, terms "first", "second", and "third" are merely for descriptive purpose, but should not be construed as indicating or implying importance in the relativity.

Finally, it should be noted that the above embodiments are merely specific implementations of the present disclosure, for illustrating the technical solutions of the present disclosure, rather than limiting the present disclosure, and the scope of protection of the present disclosure should not be limited thereto. While the detailed description is made to the present disclosure with reference to the preceding embodiments, those ordinarily skilled in the art should understand that within the technical scope disclosed in the present disclosure, anyone familiar with the present technical field still can make modifications or readily envisage changes for the technical solutions recited in the preceding embodiments, or make equivalent substitutions to some of the technical features therein; these modifications, changes, or substitutions do not make the essence of the corresponding technical solutions depart from the spirit and scope of the technical solutions of the embodiments of the present disclosure, and they all should be covered within the scope of protection of the present disclosure. Therefore, the scope of protection of the present disclosure should be subject to the protection scope of the claims.

What is claimed is:

1. A control method of an energy-storage coordinated floating wind turbine, comprising steps of:
   acquiring a frequency response unit configured for a floating wind farm, and constructing a primary frequency regulation model of the floating wind farm based on the frequency response unit, wherein the floating wind farm comprises a plurality of floating wind turbines, each of the floating wind turbines is configured with the frequency response unit, and the frequency response unit is configured to respond to a frequency change of a power system;
   acquiring an energy storage system configured for the floating wind farm, and constructing a second frequency regulation model based on the energy storage system, wherein each of the floating wind turbines is configured with the energy storage system;
   constructing, based on the primary frequency regulation model and the second frequency regulation model, a frequency regulation model of a hybrid power system containing the floating wind farm, the energy storage system, and a pre-set thermal power unit;
   acquiring a frequency change parameter of the power system through the frequency response unit, calculating a primary frequency regulation control strategy of the floating wind turbine through the primary frequency regulation model based on the frequency change parameter, and calculating a second frequency regulation control strategy of the energy storage system through the second frequency regulation model; and
   generating an overall frequency regulation control strategy of the hybrid power system according to the primary frequency regulation control strategy and the second frequency regulation control strategy;
   wherein the frequency response unit performs a comprehensive control by using a pre-set virtual inertia control mode and a droop control mode;
   the primary frequency regulation model comprises a frequency regulation branch corresponding to each of the floating wind turbines, wherein the frequency regulation branch is configured to calculate a frequency regulation output power change amount of each of the floating wind turbines according to a pre-set inertia control parameter and a droop control parameter; and
   the step of constructing a primary frequency regulation model of the floating wind farm based on the frequency response unit comprises:
   calculating the frequency regulation output power change amount of each of the floating wind turbines through the primary frequency regulation model, and collecting and processing the frequency regulation output power change amount, so as to generate an output change amount during frequency regulation of the floating wind farm;
   wherein the energy storage system is a battery energy storage system, wherein the battery energy storage system comprises an energy storage battery, an energy management system, and a power conversion system;
   the second frequency regulation model comprises an energy conversion mechanism model of the energy storage system, wherein the energy conversion mechanism model is configured to characterize a charge and discharge logic of the energy storage system; and
   the step of constructing a second frequency regulation model based on the energy storage system comprises:
   detecting a frequency feedback signal of the power system through the power conversion system; and
   calculating, based on the second frequency regulation model, a compensation power of the energy storage system according to the frequency feedback signal, wherein the compensation power is configured to compensate for a frequency deviation caused by a frequency disturbance of the power system;
   wherein the step of calculating a primary frequency regulation control strategy of the floating wind turbine through the primary frequency regulation model based on the frequency change parameter comprises:
   generating, based on the primary frequency regulation model, the primary frequency regulation control strategy by using a rotor kinetic energy control frequency regulation strategy and an overspeed load-shedding control strategy, so as to perform a frequency regulation control over the floating wind turbine;
   wherein the step of calculating a second frequency regulation control strategy of the energy storage system through the second frequency regulation model comprises:
   setting a constraint range of the energy storage battery based on remaining capacity parameters of the energy storage battery; and
   calculating the second frequency regulation control strategy within the constraint range, wherein the second frequency regulation control strategy comprises:
   controlling the energy storage battery to absorb or release an active power in accordance with a pre-set virtual inertia control strategy according to the frequency feedback signal; or, controlling the energy storage battery to be charged or discharged in accordance with a pre-set droop control strategy;
   wherein the step of generating an overall frequency regulation control strategy of the hybrid power system according to the primary frequency regulation control strategy and the second frequency regulation control strategy comprises:
   setting a frequency regulation dead band of the energy storage battery in accordance with a pre-set frequency change threshold;
   performing, within a frequency change range corresponding to the frequency regulation dead band, the frequency regulation control over the hybrid power system through the primary frequency regulation control strategy; and performing, outside the frequency change range corresponding to the frequency regulation dead band, the frequency regulation control over the hybrid power system through the primary frequency regulation control strategy; and performing, within the constraint range, the frequency regulation control over the hybrid power system through the second frequency regulation control strategy.

2. The method according to claim 1, wherein the step of constructing, based on the primary frequency regulation model and the second frequency regulation model, a frequency regulation model of a hybrid power system containing the floating wind farm, the energy storage system, and a pre-set thermal power unit comprises:

combining and processing output characteristics of the energy storage system and output characteristics of the floating wind farm, so as to generate an energy storage wind farm containing the energy storage system;

combining the energy storage wind farm with the pre-set thermal power unit to obtain the hybrid power system containing the floating wind farm, the energy storage system, and the pre-set thermal power unit;

acquiring a frequency regulation model of the thermal power unit, wherein the frequency regulation model of the thermal power unit comprises a governor model and a steam turbine model; and constructing the frequency regulation model of the hybrid power system based on the governor model, the steam turbine model, the primary frequency regulation model, and the second frequency regulation model.

3. A control device of an energy-storage coordinated floating wind turbine, comprising:

a first constructing module, configured to acquire a frequency response unit configured for a floating wind farm, and construct a primary frequency regulation model of the floating wind farm based on the frequency response unit, wherein the floating wind farm comprises a plurality of floating wind turbines, each of the floating wind turbines is configured with the frequency response unit, and the frequency response unit is configured to respond to a frequency change of a power system;

a second constructing module, configured to acquire an energy storage system configured for the floating wind farm, and construct a second frequency regulation model based on the energy storage system, wherein each of the floating wind turbines is configured with the energy storage system;

a third constructing module, configured to construct, based on the primary frequency regulation model and the second frequency regulation model, a frequency regulation model of a hybrid power system containing the floating wind farm, the energy storage system, and a pre-set thermal power unit;

a strategy module, configured to acquire a frequency change parameter of the power system through the frequency response unit, calculate a primary frequency regulation control strategy of the floating wind turbine through the primary frequency regulation model based on the frequency change parameter, and calculate the second frequency regulation control strategy of the energy storage system through the second frequency regulation model; and a control module, configured to generate an overall frequency regulation control strategy of the hybrid power system according to the primary frequency regulation control strategy and the second frequency regulation control strategy;

wherein the frequency response unit performs a comprehensive control by using a pre-set virtual inertia control mode and a droop control mode;

the primary frequency regulation model comprises a frequency regulation branch corresponding to each of the floating wind turbines, wherein the frequency regulation branch is configured to calculate a frequency regulation output power change amount of each of the floating wind turbines according to a pre-set inertia control parameter and a droop control parameter; and the step of constructing a primary frequency regulation model of the floating wind farm based on the frequency response unit comprises:

calculating the frequency regulation output power change amount of each of the floating wind turbines through the primary frequency regulation model, and collecting and processing the frequency regulation output power change amount, so as to generate an output change amount during frequency regulation of the floating wind farm;

wherein the energy storage system is a battery energy storage system, wherein the battery energy storage system comprises an energy storage battery, an energy management system, and a power conversion system;

the second frequency regulation model comprises an energy conversion mechanism model of the energy storage system, wherein the energy conversion mechanism model is configured to characterize a charge and discharge logic of the energy storage system; and the step of constructing a second frequency regulation model based on the energy storage system comprises:

detecting a frequency feedback signal of the power system through the power conversion system; and calculating, based on the second frequency regulation model, a compensation power of the energy storage system according to the frequency feedback signal, wherein the compensation power is configured to compensate for a frequency deviation caused by a frequency disturbance of the power system;

wherein the step of calculating a primary frequency regulation control strategy of the floating wind turbine through the primary frequency regulation model based on the frequency change parameter comprises:

generating, based on the primary frequency regulation model, the primary frequency regulation control strategy by using a rotor kinetic energy control frequency regulation strategy and an overspeed load-shedding control strategy, so as to perform a frequency regulation control over the floating wind turbine;

wherein the step of calculating a second frequency regulation control strategy of the energy storage system through the second frequency regulation model comprises:

setting a constraint range of the energy storage battery based on remaining capacity parameters of the energy storage battery; and calculating the second frequency regulation control strategy within the constraint range, wherein the second frequency regulation control strategy comprises:

controlling the energy storage battery to absorb or release an active power in accordance with a pre-set virtual inertia control strategy according to the frequency feedback signal; or, controlling the energy storage battery to be charged or discharged in accordance with a pre-set droop control strategy;

wherein the step of generating an overall frequency regulation control strategy of the hybrid power system according to the primary frequency regulation control strategy and the second frequency regulation control strategy comprises:

setting a frequency regulation dead band of the energy storage battery in accordance with a pre-set frequency change threshold;

performing, within a frequency change range corresponding to the frequency regulation dead band, the frequency regulation control over the hybrid power system through the primary frequency regulation control strategy; and performing, outside the frequency change range corresponding to the frequency regulation dead band, the frequency regulation control over the hybrid power system through the primary frequency regulation control strategy; and performing, within the constraint range, the frequency regulation control over the hybrid power system through the second frequency regulation control strategy.

4. An electronic equipment, comprising a processor, a storage medium, and a bus, wherein the storage medium stores machine-readable instructions executable by the processor, wherein when the electronic equipment is running, the processor is in communication with the storage medium via the bus, and the processor executes the machine-readable instructions, so as to implement the steps of the method according to claim 1.

5. The electronic equipment according to claim 4, wherein the frequency response unit performs a comprehensive control by using a pre-set virtual inertia control mode and a droop control mode;

the primary frequency regulation model comprises a frequency regulation branch corresponding to each of the floating wind turbines, wherein the frequency regulation branch is configured to calculate a frequency regulation output power change amount of each of the floating wind turbines according to a pre-set inertia control parameter and a droop control parameter; and the step of constructing a primary frequency regulation model of the floating wind farm based on the frequency response unit comprises:

calculating the frequency regulation output power change amount of each of the floating wind turbines through the primary frequency regulation model, and collecting and processing the frequency regulation output power change amount, so as to generate an output change amount during frequency regulation of the floating wind farm.

6. The electronic equipment according to claim 4, wherein the second frequency regulation model comprises an energy conversion mechanism model of the energy storage system, wherein the energy conversion mechanism model is configured to characterize a charge and discharge logic of the energy storage system; and the step of constructing a second frequency regulation model based on the energy storage system comprises:

detecting a frequency feedback signal of the power system through the power conversion system; and calculating, based on the second frequency regulation model, a compensation power of the energy storage system according to the frequency feedback signal, wherein the compensation power is configured to compensate for a frequency deviation caused by a frequency disturbance of the power system.

7. The electronic equipment according to claim 4, wherein the step of constructing, based on the primary frequency regulation model and the second frequency regulation model, a frequency regulation model of a hybrid power system containing the floating wind farm, the energy storage system, and a pre-set thermal power unit comprises:

combining and processing output characteristics of the energy storage system and output characteristics of the floating wind farm, so as to generate an energy storage wind farm containing the energy storage system;

combining the energy storage wind farm with the pre-set thermal power unit to obtain the hybrid power system containing the floating wind farm, the energy storage system, and the pre-set thermal power unit;

acquiring a frequency regulation model of the thermal power unit, wherein the frequency regulation model of the thermal power unit comprises a governor model and a steam turbine model; and constructing the frequency regulation model of the hybrid power system based on the governor model, the steam turbine model, the primary frequency regulation model, and the second frequency regulation model.

8. The electronic equipment according to claim 4, wherein the step of calculating a primary frequency regulation control strategy of the floating wind turbine through the primary frequency regulation model based on the frequency change parameter comprises:

generating, based on the primary frequency regulation model, the primary frequency regulation control strategy by using a rotor kinetic energy control frequency regulation strategy and an overspeed load-shedding control strategy, so as to perform a frequency regulation control over the floating wind turbine.

9. The electronic equipment according to claim 4, wherein the step of calculating a second frequency regulation control strategy of the energy storage system through the second frequency regulation model comprises:

setting a constraint range of the energy storage battery based on remaining capacity parameters of the energy storage battery; and calculating the second frequency regulation control strategy within the constraint range, wherein the second frequency regulation control strategy comprises:

controlling the energy storage battery to absorb or release an active power in accordance with a pre-set virtual inertia control strategy according to the frequency feedback signal; or, controlling the energy storage battery to be charged or discharged in accordance with a pre-set droop control strategy.

10. The electronic equipment according to claim 4, wherein the step of generating an overall frequency regulation control strategy of the hybrid power system according to the primary frequency regulation control strategy and the second frequency regulation control strategy comprises:

setting a frequency regulation dead band of the energy storage battery in accordance with a pre-set frequency change threshold;

performing, within a frequency change range corresponding to the frequency regulation dead band, the frequency regulation control over the hybrid power system through the primary frequency regulation control strategy; and performing, outside the frequency change range corresponding to the frequency regulation dead band, the frequency regulation control over the hybrid power system through the primary frequency regulation control strategy; and performing, within the constraint range, the frequency regulation control over the hybrid power system through the second frequency regulation control strategy.

* * * * *